United States Patent [19]

Böning et al.

[11] Patent Number: 4,487,184
[45] Date of Patent: Dec. 11, 1984

[54] CONTROL OF AN INTERNAL COMBUSTION ENGINE WITH REFERENCE TO A COMBUSTION CHAMBER SENSOR

[75] Inventors: Bernward Böning; Rainer Bone, both of Vaihingen; Rudolf Nagel, Asperg; Franz Sellmaier, Schwieberdingen, all of Fed. Rep. of Germany

[73] Assignee: Robert Bosch GmbH, Stuttgart, Fed. Rep. of Germany

[21] Appl. No.: 482,327

[22] Filed: Jul. 7, 1983

[51] Int. Cl.³ .................................................. F02D 37/02
[52] U.S. Cl. .................................. 123/425; 123/416; 123/418; 123/422
[58] Field of Search ............... 123/425, 418, 414, 435, 123/415, 416; 73/35, 115

[56] References Cited

U.S. PATENT DOCUMENTS

| | | | |
|---|---|---|---|
| 4,112,890 | 9/1978 | Manger et al. | 123/422 |
| 4,162,666 | 7/1979 | Maiaglio | 123/418 |
| 4,237,835 | 12/1980 | Rabus et al. | 123/418 |
| 4,258,684 | 3/1981 | Schira | 123/418 |
| 4,268,888 | 5/1981 | Bodig et al. | 123/418 |
| 4,326,486 | 4/1982 | Mezger et al. | 123/418 |
| 4,374,510 | 2/1983 | Komurosaki et al. | 123/425 |
| 4,385,605 | 5/1983 | Petric et al. | 123/414 |
| 4,385,606 | 5/1983 | Hattori et al. | 123/416 |
| 4,417,556 | 11/1983 | Latsch | 123/425 |
| 4,429,365 | 1/1984 | Lackman et al. | 123/414 |

Primary Examiner—Raymond A. Nelli
Attorney, Agent, or Firm—Frishauf, Holte, Goodman & Woodward

[57] ABSTRACT

The output of a combustion chamber sensor is analyzed in two succeeding time intervals defined in term of crankshaft position by use of a reference mark. The sensor output is compared with prescribed threshold values in the respective intervals, and a logic circuit recognizes whether normal combustion, slow combustion or a combustion failure is present and an engine control, such as fuel injection or ignition timing, or a combination of both is modified accordingly.

7 Claims, 6 Drawing Figures

CONTROL OF AN INTERNAL COMBUSTION ENGINE WITH REFERENCE TO A COMBUSTION CHAMBER SENSOR

This invention concerns a control system for an internal combustion engine equipped with a combustion chamber sensor which provides a signal for adjustment of fuel injection, ignition or the like, and also a reference mark sensor for timing the response of the first-mentioned sensor with reference to crankshaft position.

It is known to provide corrective control of internal combustion engines with reference to combustion chamber sensors which measure combustion chamber pressure, combustion chamber light, ion current, or the like. It is further known to provide the corrective action in response to such a sensor to make some variation of some engine function, such as fuel injection, ignition, exhaust gas recycling or turbo-supercharging.

A system for adjustment of an ignition system in an internal combustion engine of a vehicle is known from DE-OS No. 29 35 725 in which the signal of an ion-current sensor in the combustion chamber of the engine is evaluated. From the ion-current signal, the time course of the combustion operation is ascertained, taken into consideration with a reference signal and caused to produce finally a correction signal for setting a spark advance.

The known system allows only a coarse correction by ignition timing shift and, in particular, marginal conditions at the extreme portions of the operating range of the engine are ascertained only incompletely or not at all.

THE INVENTION

It is an object of the present invention to provide the appropriate control according to the output of a combustion chamber sensor to an engine in a reliable fashion and over its full range of operation.

Briefly, by reference to the reference mark sensor, the combustion chamber sensor signal is evaluated in two particular time intervals for distinctly recognizing low combustion and failure of combustion, as well as normal combustion, by the use of two threshold values of sensor output and from this evaluation the corrective action with regard to fuel injection, ignition timing, or whatever, is taken.

The system of the invention has the advantage that normal combusion, slow combustion and combustion failure are distinctly recognized, and the appropriate response can be applied to the engine in case of slow combustion or combustion failure, even when it is operating at the margin of its operating range. The engine can therefore be controlled with an optimal compromise regarding fuel consumption, exhaust gas and driving comfort. Finally, the system of the invention makes it possible to the same extent to recognize knocking of the engine.

In a preferred embodiment of the invention, an ion-current sensor is used which is built into in a regular sparkplug of the engine. In this manner, proven kinds of circuits can be utilized and no supplementary transducer is necessary in the engine combustion chamber.

In a further development of the invention, a simple logical interrelation of the signals produced in the respective time intervals is provided so that simple processing of the observed signals can be performed in a microcomputer.

THE DRAWINGS

The invention is further described by way of illustrative example with reference to the annexed drawings, in which.

DESCRIPTION OF THE ILLUSTRATED EMBODIMENTS

Figure 1:
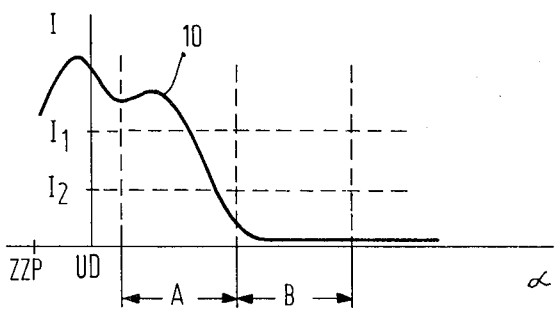
FIG. 1 is a graph of the output signal of a combustion chamber sensor in the case of normal combustion.
Figure 2:
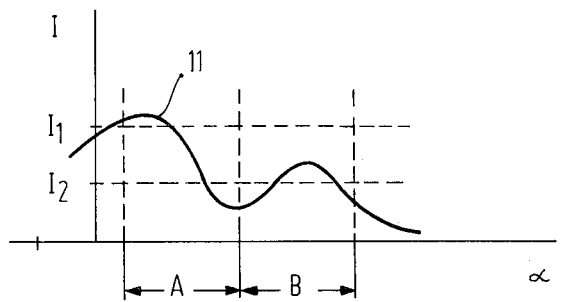
FIG. 2 is a graph of the output of the same sensor in the case of slow combustion.
Figure 3:
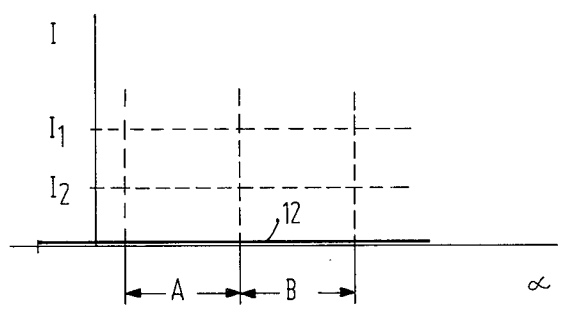
FIG. 3 is a graph of the output signal of the same sensor in the case of combustion failure.

The sensor output signals 10,11 and 12 are respectively plotted in FIGS. 1,2 and 3 against the crankshaft angle, with the zero point on the abscissa made to coincide with the upper deadpoint UD for the cylinder in which the sensor is located. The curves plotted in FIGS. 1 to 3 are, for example, the signal output provided by the ion current I of an ion current sensor. It is to be understood, however, that other kinds of signals known in the art, such as combustion chamber pressure, combustion chamber light, combustion chamber temperature, or the like, could be used.

As can be seen from FIG. 1, the ion-current signal I rises after the instant of ignition ZZP, runs through a first maximum before the upper deadpoint and through a second maximum after the upper deadpoint and finally falls toward zero. According to the invention two time intervals A and B are defined, the first of these corresponding substantially to the time interval during which normal combustion occurs, and the second being an interval immediately following the first. In the second time interval B the output signal 10, in the case of normal combustion, is close to zero. If a threshold value $I_1$ is defined for the time interval A and a threshold value $I_2$ for the second time interval B, it is easy to see that the threshold value in interval A is exceeded and the threshold value in interval B is not overstepped, so long as the signal 10 of a normal combustion is present.

In the case of the output signal 11 of a slow combustion, illustrated in FIG. 2, a further maximum appears in interval B, to such an extent that in this time interval B the threshold value $I_2$ is overstepped.

In the output signal 12 of a combustion failure, shown for completeness in FIG. 3, there is no output either in interval A or in interval B, so that neither of the threshold values $I_1$ and $I_2$ is overstepped.

According to the invention, a logical correlation of signals is provided for distinguishing the output signals of a normal combustion 10, a slow combustion 11, or a combustion failure 12, and this correlation is in terms of the respective threshold values $I_1$ and $I_2$ in the intervals A and B.

Figure 4:
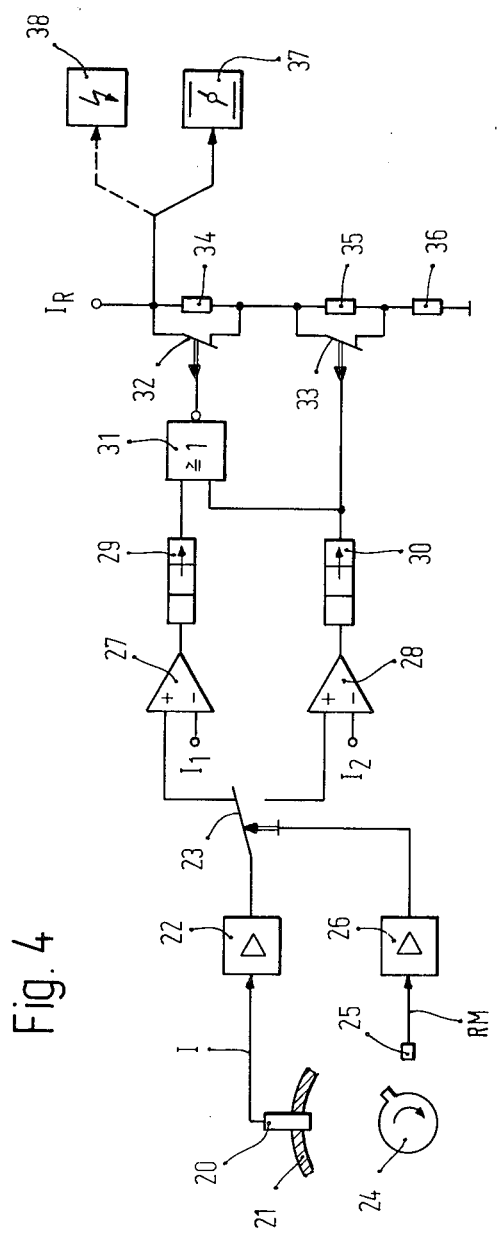
FIG. 4 is a block circuit diagram of a first embodiment of a system according to the invention.

In the case of the first illustrative embodiment shown in FIG. 4, the combustion chamber sensor 20 is preferably an ion-current sensor in a mass-produced sparkplug. The sensor 20 is disposed in a combustion chamber wall 21. The signal I is supplied to an evaluation circuit 22, which is connected to a transfer switch 23. A reference mark 25 is operatively related to a reference mark sensor 25 which generates a reference mark signal RM when the reference mark passes by. The signal RM is supplied to an evaluation circuit 26 that represents a time control. The evaluation circuit 26 provides a timed control of the transfer switch 23 in such a way that in the time interval A the transfer switch 23 is in the position shown in the drawing and in the time interval B it is in the other of its two end positions. In the position shown in the drawing, the switch 23 produces a connection to a first comparator 27, the comparison input of which is connected to the threshold value $I_1$. In the other position, not shown in the drawing, the switch 23 brings into operation a second comparator 28, to which the threshold value $I_2$ is also supplied. The comparators 27 and 28 provide their respective outputs to temporary storage circuits 29 and 30 in which the output signals of the comparator 27 and 28 are maintained until the evaluation of combustion chamber cycle has terminated.

In the embodiment according to claim 4, the logical correlation is performed on the one hand by NOR-gate 31 to which the storage inputs of the circuits 29 and 30 are connected, with the output of the NOR-gate 31 being connected to a first output switch 32, while the storage output of the circuit 30 is also provided to a second output switch 33. The logic output switches 32 and 33 are connected so as to open or close respective bridges across the resistances 34 and 35 which form a voltage divider along with still another series resistance 36. A control current $I_R$ is applied to the voltage divider. The voltage drop across the resistances 34, 35 and 36 is supplied to a control device of the engine, for example a fuel injector 37 or an ignition system 38.

The manner of operation of the system of FIG. 4 is as follows:

The time control provided by the evaluation circuit 26 has the effect that the signal I is compared in the time interval A in the comparator 27 with the threshold value $I_1$ and in the time interval B in the comparator 28 with the threshold value $I_2$. In the case of normal combustion, as shown in FIG. 1, the threshold value $I_1$ is always reached, and the threshold value $I_2$ is never reached. Accordingly, the output of the comparator 27 lies at logic value 1 and that of the comparator 28 at logic value 0. In consequence, the NOR-gate 31 is blocked and both switches 32 and 33 are in the respective positions thereof shown in the drawing. The resistances 34 and 35 are thereby both bridged and the voltage drop produced across the resistor 36 by the control current $I_R$ produces the control signal, for example for the fuel injector 37.

If now the engine reaches the edge of its operating range, slow combustion will first set in, which shows up, according to FIG. 2, in the threshold value $I_1$ still being reached, while at the same time the threshold value $I_2$ is also reached. The NOR-gate 31 continues to be blocked and the switch 32 closed, but the switch 33 now opens, because the comparator 28 goes from logic 0 to logic 1. A further resistance 35 is now added to the resistance 36 and the control signal for the fuel injector 37 correspondingly rises, so that fuel injection is increased.

If combustion failures should now occur, both comparators 27 and 28 go to logic 0, so that the NOR-gate 31 is now switched over and the switch 32 opened. The resistance 34 is, for example, made larger than the resistance 35, so that now a still greater overall resistance is provided which leads to a further increase of the fuel injection.

It is to be understood that the arrangement of the resistances 34, 35 and 36 is shown only by way of example, in order to illustrate the raising of the fuel injection with the changing of operating conditions in the engine. Of course, still other changes in the condition of the setting device of the engine in response to reaching of the above-described operating conditions are possible.

Figure 5:
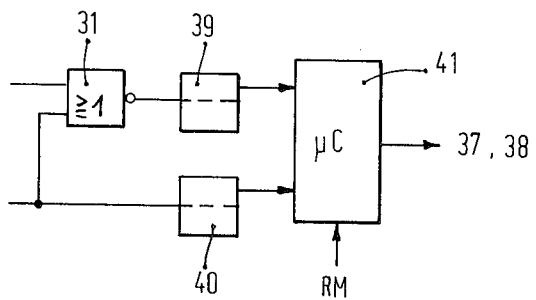
FIG. 5 is a block circuit diagram of a modification of the system of FIG. 4.

In modification of the system of FIG. 4 illustrated in FIG. 5 sets two stores, for example flipflop 39 and flipflop 40, respectively, upon reaching the operating conditions "slow combustion" and "combustion failure". These stores 39 and 40 are cyclically interrogated by a microcomputer 41 to which the reference mark signal RM is also supplied. The microcomputer 41 checks the condition of the flipflops 39 and 40 at instants timed with reference to the signal RM and corresponding to the time intervals A and B and sets the respective engine controls 37 and 38 not shown in the drawing.

Figure 6:
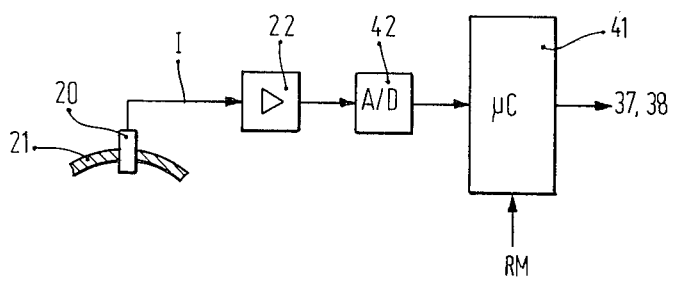
FIG. 6 is a block circuit diagram of a second embodiment of a system according to the invention.

FIG. 6 finally shows another embodiment of a system according to the invention where the comparison with the threshold values $I_1$ and $I_2$ again takes place in the microcomputer 41. For this purpose, the signal is processed in a manner suitable for supplying it to a microcomputer through means of an analog-to-digital converter 42. At the output of the converter 42, the momentary signal I now appears in digitial form. The microcomputer 41 cyclically checks, in a manner dependent upon the signal RM, the signal of the converter 42 so as to check this momentary value at times that correspond to the intervals A and B, comparing them with respective prescribed threshold values $I_1$ and $I_2$ held in a store. Depending on whether these threshold values $I_1$ and $I_2$ are reached, the positioning or control devices 37 and 38 are shifted or operated in the manner described above to provide corrective action.

In the embodiments described above, a logic system was described by way of example in which the retarded combustions are recognized by a positive signal in the interval B and combustion failures by 0-signals in both intervals A and B. It is of course also possible to recognize slow combustions by a 0-signal in interval A and a positive signal in interval B, or to limit the recognition of combustion failures to the provision of a 0-signal in the interval A. It will be further understood that instead of the setting or control organs 37 and 38, that were brought in purely for illustration, various known types of controllers can be used and, in a preferred embodiment of the invention, an integrating controller. Furthermore, the activating or setting of both the controls 37 and 38 together is possible, so that at the same time the ignition timing and the fuel injection can be controlled and, thereby, the exhaust gas composition.

We claim:

1. Corrective monitoring system for an internal combustion engine, comprising:
    a first sensor (20) in a combustion chamber of said engine for producing an electrical signal indicative of the extent of combustion in said chamber;
    a second sensor responsive to the passage of a reference mark on a rotary part of said engine for producing electrical reference mark signals synchronized with engine shaft revolution;
    means for deriving first and second timing gate signals (A,B) from said reference mark signal respectively designating successive time intervals which are fixed in time with reference to said reference mark signal;

first threshold switch means (27) arranged to be connected to the output of said first sensor during the presence of said first timing gate signal (A) for comparing the signal of said first sensor with a first reference signal value;

second threshold switch means (28) arranged to be connected to the output of said first sensor during the presence of said second timing gate signal (B) for comparing the signal of said first sensor to a second reference signal value, and logic circuit means connected to the respective outputs of said first and second threshold switch means for recognizing normal combustion, slow combustion and lack of combustion in engine cycles respectively beginning with individual reference mark signals, and having outputs connected to a control device of said engine for modifying engine operating conditions according to whether normal combustion, slow combustion or combustion failure is recognized by said logic circuit means, said logic circuit means being so constituted as to recognize a slow combustion condition when said second threshold switch means responds to a signal of said first sensor reaching said second reference signal value and to recognize a failure of combustion when neither said first threshold switch means nor said second threshold switch means response to a rise of said signal of said sensor reaching respectively said first and said second reference signal values.

2. System according to claim 1, in which said first sensor is an ion current sensor.

3. System according to claim 2, in which said ion current sensor (20) is built into a sparkplug of said engine.

4. System according to claim 1, in which said means for deriving said first and second timing gate signals from said reference mark signal are connected to control a transfer switch (23) for alternately connecting said first threshold switch means and said second threshold switch means to the output of said first sensor.

5. System according to claim 4, in which said engine control device is a fuel injection control device, and in which said logic circuit means are so constituted as to increase fuel injection upon recognition of slow combustion and to increase fuel injection to a greater extent upon recognition of failure of combustion.

6. System according to claim 1, in which said logic circuit means are constituted by signal stores (29,30,39,40) for storing outputs of said first and second threshold switch means and a microcomputer (41) constituted for cyclically interrogating said signal stores and controlling an engine control adjustment in response thereto.

7. System according to claim 1, in which said gate signal deriving means, first and second threshold switch means and logic circuit means are constituted by a microcomputer (41) and in which an analog-to-digital converter (22) is connected to the output of said first sensor for converting the said output into digital form and supplying digital signals to said microcomputer for cyclical comparison during the periods of said first and second timing gate signals respectively with said first and second reference signal values.

* * * * *